United States Patent Office 3,522,256
Patented July 28, 1970

3,522,256
5-NITROFURAN AND 5-NITROTHIOPHENE DERIVATIVES
Herbert Berger, Sulzberg-Ried, Allgau, Rudi Gall, Mannheim-Feudenheim, Kurt Stach, Mannheim-Waldhof, and Wolfgang Voemel, Mannheim, Germany, assignors to Boehringer Mannheim Gesellschaft mit beschrankter Haftung, a corporation of Germany
No Drawing. Filed Apr. 20, 1967, Ser. No. 638,174
Claims priority, application Germany, June 18, 1966, B 87,610
Int. Cl. C07d 51/04
U.S. Cl. 260—250       5 Claims

ABSTRACT OF THE DISCLOSURE

A novel series of compounds characterized by antimicrobial properties having the following formula:

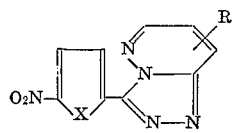

wherein X is an oxygen or sulfur atom and R indicates aryl hydrogen, halogen, alkyl, aralkyl, amino, acylated amino, hydroxyl, mercapto, alkoxy, alkylmercapto, aralkoxy, aralkyl-mercapto or a carboxylic acid group, which latter group may be esterified or amidated. Included within the scope of the invention are the medicinal agents containing the aforesaid novel compounds as well as the method of using the novel compounds.

---

This invention relates to 5-nitrofuran and 5-nitrothiophene derivatives and more particularly this invention relates to compounds having the following formula:

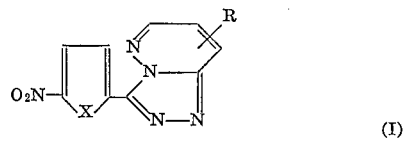
(I)

wherein X is oxygen or sulfur and R is hydrogen, halogen, unsubstituted or substituted alkyl, aralkyl, aryl, amino, acylated amino, hydroxyl, mercapto, alkoxy, alkylmercapto, aralkoxy, aralkylmercapto or a carboxylic acid group which latter group may be esterified or amidated.

The compounds of this invention are useful in the preparation of medicinal agents. The compounds are useful because of their antimicrobial properties, particularly against *Escherichia coli*, *Staphylococcus aureus*, *Pseudomonas aeruginosa* and *Proteus mirabilis*. As most surprisingly, the new compounds also exhibit a high antibacterial activity in urine, they are outstandingly useful for the treatment of infections of the urinary tract.

The compounds of this invention can be prepared by one of the following methods.

(1) Treatment of a hydrazone of the formula:

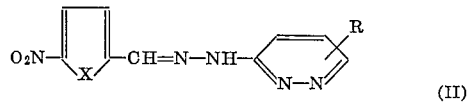
(II)

in which X and R have the meanings given hereinabove, with an oxidation agent; or (2) Condensation of a hydrazino-pyridazine of the formula:

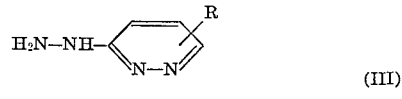
(III)

in which R has the meaning given hereinabove, with a carboxylic acid of the formula:

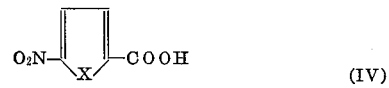
(IV)

in which X has the meaning given hereinabove; or (3) Treatment of an amidrazone of the formula:

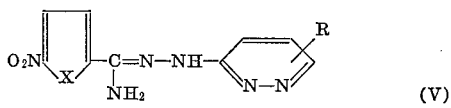
(V)

in which X and R have the meanings given hereinabove, with an agent for splitting off the elements of ammonia.

The hydrazones having structural Formula II used as starting materials are obtained, in the conventional manner, by the condensation of 5-nitrofurfural or of 5-nitrothienylaldehyde with the corresponding 3-hydrazinopyridazine. The oxidative cyclization of the compounds (II) according to the present invention, can be brought about by the conventional mild oxidation agents. Lead tetraacetate and ferric chloride have proved to be particularly useful for this purpose. The reaction is carried out in a suitable solvent, such as for example glacial acetic acid or an alcohol, at room temperature or with warming.

For the condensation of the compounds (III) and (IV), the two reaction components are simply heated in an inert, high-boiling solvent, such as diethylene-glycol dimethyl ether. The products can thereafter be isolated by the addition of water, making the mixture alkaline and extracting with an organic solvent.

The amidrazones having the Formula V used as starting materials are obtained by the condensation of 5-nitro-2-furan- or 5-nitro-2-thiophene-imido ethers with the corresponding 3-hydrazino-pyridazines. The cyclization, according to the present invention, of the compounds (V) can be carried out simply by heating in an inert solvent. However, the splitting off of the elements of ammonia can also be brought about by treatment of the amidrazones (V) with aqueous mineral acids at room temperature.

The following examples are given for the purpose of illustrating the present invention and are not to be construed as in any way limiting the invention.

EXAMPLE 1

3-(5-nitro-2-furyl)-6-methyl-s-triazolo-[4,3-b]-pyridazine

Method A.—5.5 g. 1-(5-nitro-2-furfurylidene)-2-(3-methyl-6-pyridazinyl)-hydrazine were taken up in 700 ml. ethanol. Concentrated hydrochloric acid was then added at boiling point until a clear solution was obtained (about 2 ml.) and then, while boiling under reflux, a solution of 29 g. ferric chloride hexahydrate in 330 ml. ethanol was added in the course of 45 minutes. The reaction mixture was thereafter boiled under reflux for 3 hours and allowed to cool overnight. The solid material which, in the meantime had separated, was filtered off with suction, washed with alcohol and recrystallized from 100 ml. 80% aqueous dimethyl formamide, with the addition of 0.5 g. activated charcoal, the solution in this connection only being heated to 110° C. There were thusly obtained 3.35 g. (611.4% of theory) 3-(5-nitro-2-furyl)-6-methyl-s-triazolo-[4,3-b]-pyridazine in the form of crystals having a melting point of 246–247° C. (decomp).

*Analysis.*—$C_{10}H_7N_5O_3$ (M.W. 245). Calc. (percent): C, 49.0; H, 2.86; N, 28.6. Found (percent): C, 49.04; H, 3.13; N, 28.46.

The 1 - (5-nitro-2-furfurylidene)-2-(3-methyl-6-pyridazinyl)-hydrazine used as starting material was prepared in the following manner:

6.65 g. 3-methyl-6-hydrazino-pyridazine semi-hydrate were dissolved in 50 ml. dioxan and mixed, at 50° C., with 7 g. 5-nitro-2-furfural. The reaction was allowed to continue for about 30 minutes at 50° C. The crystals which were obtained upon cooling were filtered off with suction, washed with dioxan and thereafter with ether producing 10.5 g. (85% of theory) 1-(5-nitro-2-furfurylidene) - 2 - ( 3- methyl-6-pyridazinyl)-hydrazine having a melting point of 242–243° C. (decomp.).

Method B.—1.2 g. 3-methyl-6-hydrazino-pyridazine and 3.1 g. 5-nitro-furan-2-carboxylic acid in 5 ml. diethyleneglycol dimethyl ether were heated under reflux, while stirring, for 1 hour. The reaction mixture was thereafter cooled, diluted with water and rendered alkaline. Following extraction with methylene chloride, there was obtained a crystalline product having a melting point of 245–246° C. which was identical with the product obtained according to method A.

EXAMPLE 2

3-(5-nitro-2-furyl)-s-triazolo-[4,3-b]-pyridazine

Method A.—0.75 g. N-(3-pyridazinyl-amino)-5-nitro-2-furamidine were shaken for about 10–15 minutes at room temperature with dilute aqueous hydrochloric acid. The insoluble product which formed was then filtered off with suction, washed with water and dried. There were thusly obtained 0.4 g. 3-(5-nitro-2-furyl)-s-triazolo-[4,3-b]-pyridazine in the form of crystals having a melting point of 280–283° C. (decomp.). 0.25 g. of the starting material, i.e. N-(3 - pyridazinyl-amino) - 5 - nitro-2-furamidine, could be precipitated out from the acidic aqueous filtrate by rendering it alkaline (about pH 8) with a concentrated aqueous solution of ammonia.

*Analysis.*—$C_9H_5N_5O_3$ (M.W. 231). Calc. (percent): C, 46.7; H, 2.17; N, 30.3. Found (percent): C, 46.59; H, 2.74; N, 30.13.

The N-(3-pyridazinyl-amino) - 5 - nitro - 2 - furamidine used as starting material was prepared in the following manner:

0.92 g. 5-nitro-2-furan-imidoethyl ether was dissolved in 5 ml. methanol and mixed with a solution of 0.55 g. 3-hydrazino-pyridazine in 4.5 ml. water. The reaction was allowed to continue for about 10 minutes at 50° C. and thereafter cooled. A crude N-(3-pyridazinyl-amino)-5-nitro-2-furamidine separated out. The yield amounted to 1 g. The N-(3-pyridazinyl-amino)-5-nitro-2-furamidine compound had a melting point of 215–218° C. (decomp.).

Method B.—5.4 g. 1 - (5 - nitro-furfurylidene) - 2 - (3-pyridazinyl)-hydrazine hydrochloride (M.P. 235° C., decomp.) was dissolved in 27 ml. glacial acetic acid and 13.3 g. lead tetraacetate was thereafter introduced into the solution portionwise. The temperature was increased to 45° C., and there resulted a pale brown suspension which, after the completion of the addition of the lead tetraacetate was stirred for 30 minutes on a waterbath at 60° C. The reaction mixture was then cooled, filtered with suction and the residue thoroughly washed with water. The crystals which are obtained were recrystallized from dimethyl formamide and washed with water. In this manner, there were obtained 1.9 g. (41% of theory) of the cyclization product having a melting point of 289–293° C., which was identical with the compound obtained according to method A (mixed melting point without depression; infra-red spectrum practically identical).

EXAMPLE 3

3-(5-nitro-2-thienyl)-6-methyl-s-triazolo-[4,3-b]-pyridazine 5.2 g. 1-(5-nitro-2-thienylidene)-2-(3-methyl-6-pyridazinyl)-hydrazine (M.P. 264–266° C., decomp.) were suspended in 30 ml. glacial acetic acid. 13.3 g. lead tetraacetate was then introduced into the solution portionwise, while stirring. The internal temperature of the reaction mixture thereby was increased to a maximum of 52° C. After completion of the addition of the oxidation agent, the suspension was stirred for a further 30 minutes on a waterbath at 60° C. and then cooled. The reaction mixture was thereafter filtered with suction, the yellowish crystals obtained thoroughly washed with water and recrystallized from dimethyl formamide. There were obtained 2.2 g. (43% of theory) pure 3-(5-nitro-2-thienyl)-6-methyl-s-triazolo-[4,3-b]-pyridazine having a melting point of 207–210° C.

EXAMPLE 4

3-(5-nitro-2-furyl)-6-chloro-s-triazolo-[4,3-b]-pyridazine

In a manner analogous to that described above, 3-(5-nitro-2-furyl)-6-chloro-s-triazolo-[4,3-b]-pyridazine was obtained in 79% yield by the oxidative cyclization of 1 - (5 - nitro-furfurylidene) - 2 - (3 - chloro - 6 - pyridazinyl)-hydrazine (M.P. 250–254° C.) with lead tetraacetate. After recrystallization from dimethyl formamide, the product melted at 222–226° C. and was recovered in the form of yellow crystals.

EXAMPLE 5

3-(5-nitro-2-furyl)-7-amino-s-triazolo-[4,3-b]-pyridazine

A solution of 7.5 g. ferric chloride hexahydrate in 15 ml. ethanol was added dropwise to 1.2 g. 1-(5-nitro-2-furfurylidene)-2-(5-amino-3-pyridazinyl)-hydrazine in 12 ml. ethanol boiling under reflux, and the reaction mixture boiled under reflux for 3 hours. A further 3.75 g. ferric chloride hexahydrate in 7 ml. ethanol were added dropwise and boiling under reflux is continued for another 6 hours. After cooling, the insoluble matter which had formed was filtered off with suction, the filtrate evaporated in a vacuum to about one quarter of its volume, water then added and the yellow crystals which thereby separated out were filtered off with suction. There were thereby obtained 0.35 g. 3-(5-nitro-2-furyl)-7-amino-s-triazolo-[4,3-b]-pyridazine which, upon heating to about 320° C., turned black. The product thus obtained was almost pure when analyzed by paper-chromatography. The NMR spectrum, the infra-red spectrum and the CH values of the combustion analysis confirmed the structure.

The 1 - (5 - nitro - 2 - furfurylidene) - 2 - (5 - amino - 3-pyridazinyl)-hydrazine used as starting material was prepared as follows:

2.3 g. 3-chloro-5-amino-pyridazine were heated for 3 hours on a steam bath with 6.5 ml. anhydrous hydrazine, cooled, 22 ml. water added thereto, allowed to crystallize with cooling, and the crystals formed filtered off with suction and washed with cold isopropanol. There were obtained 1.23 g. 3-hydrazino-5-amino-pyridazine having a melting point of 169–176° C. (foaming). The mother liquor was evaporated in a vacuum and the residue triturated with methanol, whereby there were obtained a further 1.43 g. 3-hydrazino-5-amino-pyridazine having a melting point of 160–162° C. (foaming). 1.4 g. of the crude product thusly obtained were dissolved in 20 ml. 80% aqueous ethanol and 0.7 ml. glacial acetic acid by heating, 1.8 g. 5-nitro-2-furfural were then added thereto, the reaction mixture boiled under reflux for 45 minutes and, after cooling, the precipitated crystals filtered off with suction. There were thereby produced 2.1 g. 1-(5-nitro-2-furfurylidene) - 2 - (5 - amino - 3 - pyridazinyl) - hydrazine, which could be used without further purification.

The anti-microbial activity and particularly the bacteriostatic activity of the compounds in accordance with the invention was evaluated in vitro with respect to a large number of organisms including *Staphylococcus aureus, Streptococcus faecalis, Escherichia coli, Proteus mirabilis, Proteus vulgaris, Pseudomonas aeruginosa* and *Aerobacter aerogenes.*

The absolute bacteriostatic minimal concentration in μg./ml. was determined for the following compounds of the invention and for three known compounds as set out hereinafter:

(A) 3 - (5 - nitro - 2 - furyl) - 6 - methyl - s - triazolo - [4,3-b]-pyridazine.

(B) 3 - (5 - nitro - 2 - furyl) - 6 -chloro - s - triazolo - [4,3-b]-pyridazine.

(C) 3 - (5 - nitro - 2 - furyl) - s -triazolo - [4,3 - b] - pyridazine.

(D) 3 - (5 - nitro - 2 -thienyl) - 6 - methyl - s -triazolo - [4,3-b]-pyridazine.

(E) Furacin—trade name for nitrofurazone (5-nitro-2-furaldehyde semi-carbazone)—Eaton Laboratories, Norwich, N.Y.

(F) Furoxon—trade name for furazolidone 3-(5-nitrofurfurylideneamino)-2-oxazolidinone — Eaton Laboratories, Norwich, N.Y.

(G) Furadantin—trade name of nitrofurantoin (N-(5-nitro - 2 - furfurylidene) - 1 - aminohydantoin)—Eaton Laboratories, Norwich, N.Y.

The results are set out in the following table:

BACTERIOSTATIC ACTIVITY IN VITRO

| Organism | Absolute bacteriostatic minimal concentration in μg./ml. for— | | | | | | |
|---|---|---|---|---|---|---|---|
| | A | B | C | D | E | F | G |
| Staphylococcus aureus, SG 511 (12) | 2 | 4 | 4 | 8 | 8 | 1 | 4 |
| Staphylococcus aureus (97) | 0.25 | 0.5 | 0.25 | | 4 | 0.5 | 4 |
| Streptococcus faecalis (155) | 0.25 | 0.5 | 1 | >128 | 16 | 4 | 4 |
| Streptococcus faecalis (156) | 1 | 4 | 8 | | 16 | 2 | 4 |
| Escherichia coli (18) | 0.062 | 0.125 | 0.25 | 2 | 4 | 0.25 | 4 |
| Escherichia coli (106) | 0.031 | 0.031 | 0.031 | | 2 | 0.125 | 4 |
| Proteus mirabilis (279) | 16 | 64 | 8 | | 32 | 16 | 64 |
| Proteus mirabilis (298) | 2 | 8 | 4 | >256 | 64 | 32 | 128 |
| Proteus vulgaris (206) | 0.016 | 0.031 | 0.062 | | 32 | 2 | 64 |
| Proteus vulgaris (207) | 1 | 2 | 2 | | 64 | 16 | 64 |
| Pseudomonas aeruginosa (55) | 2 | 2 | 0.125 | | 32 | 64 | 128 |
| Pseudomonas aeruginosa (71) | 1 | 1 | 0.031 | >128 | >64 | 64 | 128 |
| Pseudomonas aeruginosa (164) | 4 | 4 | 0.5 | | >64 | >64 | >64 |
| Pseudomonas aeruginosa (194) | 32 | 32 | 1 | | >64 | 64 | >64 |
| Aerobacter aerogenes (91) | 0.008 | 0.125 | 0.062 | | 16 | 0.5 | 4 |
| Aerobacter aerogenes (167) | 0.062 | 0.25 | 0.062 | | 2 | 0.125 | 4 |

The compounds in accordance with the instant invention are antimicrobials and have been found to be bactericidal to the pathogens found in surface infections, gram-negative as well as gram-positive. They additionally have utility as agents for routine treatment of acute and chronic bacterial infection in the urinary tract, including those caused by *Staphylococcus aureus, Escherichia coli, Proteus Mirabilis, Proteus vulgaris, Pseudomonas aeruginosa*. Further they lend themselves because of their properties to use in the prevention and treatment of surface infections of wounds, severe burns, cutaneous ulcers, pyodermas, osteomyelitis, preparation of wounds and burns for skin grafting and prevention of infection of grafts and donor sites.

The compounds of the invention can be employed in the form of aqueous solutions or suspensions thereof, as for instance, in the form 0.01 to 0.05% aqueous suspension or solution; in the form of solutions in non-aqueous, hygroscopic liquid vehicles such as polyethylene glycol, for instance 0.1 to 0.5% solutions in polyethylene glycol; incorporated into a water-soluble ointment-like base (concentration 0.1 to 0.5%) or in a powder base composed, for instance, of water-soluble polyethylene glycols (concentrations 0.1 to 0.5%); or in a form suitable for ingestion. Thus a preferred form is a tablet containing 50 to 200 mg. of active compound. Depending upon the condition, symptomatic and laboratory responses, 100 to 400 mg. per day can be administered. Another preferred form for orally administering the compounds of the invention is in the form of a suspension thereof in a water-miscible flavored gel. Such gel can contain from 1 to 10 mg. compound per cc.

We claim:

1. A compound having the formula:

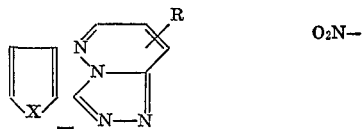

wherein X is a member selected from the group consisting of oxygen and sulfur, and R is a member selected from the group consisting of hydrogen, halogen, lower alkyl and amino.

2. A compound according to claim 1 designated 3-(5-nitro-2-furyl)-6-methyl-s-triazolo-[4,3-b]-pyridazine.

3. A compound according to claim 1 designated 3-(5-nitro-2-furyl)-6-chloro-s-triazolo-[4,3-b]-pyridazine.

4. A compound according to claim 1 designated 3-(5-nitro-2-furyl)-s-triazolo-[4,3-b]-pyridazine.

5. A compound according to claim 1 designated 3-(5-nitro-2-thienyl)-6-methyl-s-triazolo-[4,3-b]-pyridazine.

References Cited

Chemical Abstracts, vol. 67, 54151(b), Jan. 3, 1967.

NICHOLAS S. RIZZO, Primary Examiner

U.S. Cl. X.R.

424—250